US005848453A

United States Patent [19]

Racodon

[11] Patent Number: 5,848,453

[45] Date of Patent: Dec. 15, 1998

[54] GRIPP FOR HAND STRIKE TOOLS

[75] Inventor: Gérald Racodon, St. Etienne, France

[73] Assignee: Societe D'Exploitation Des Establissements Racodon S.A., France

[21] Appl. No.: 775,936

[22] Filed: Jan. 3, 1997

[30] Foreign Application Priority Data

Jan. 5, 1996 [FR] France .................................. 96 00287

[51] Int. Cl.[6] ...................................................... B62K 21/26

[52] U.S. Cl. ............... 16/114 R; 16/116 R; 16/DIG. 12; 30/295; 74/551.9; 173/162.2

[58] Field of Search ............................. 16/114 R, 116 R, 16/116 A, DIG. 12, DIG. 18, DIG. 19; 30/167, 295; 74/551.9; 173/162.1, 162.2

[56] References Cited

U.S. PATENT DOCUMENTS

| | | | |
|---|---|---|---|
| 1,133,622 | 3/1915 | Darling | 16/DIG. 12 |
| 1,980,655 | 11/1934 | Balistreri | 15/143.1 |
| 2,701,379 | 2/1955 | Balistreri | 16/116 R |
| 4,044,625 | 8/1977 | D'Haem et al. | 16/116 R |
| 4,133,362 | 1/1979 | Kolloch et al. | 30/167 |
| 4,941,232 | 7/1990 | Decker et al. | 16/111 R |
| 4,972,733 | 11/1990 | Olmr et al. | 81/177.1 |

FOREIGN PATENT DOCUMENTS

| | | | |
|---|---|---|---|
| 372033 | 8/1983 | Austria . | |
| 2256005 | 7/1975 | France | 30/167 |
| 95/32077 | 11/1995 | WIPO . | |

*Primary Examiner*—Chuck Y. Mah
*Assistant Examiner*—Donald M. Gurley
*Attorney, Agent, or Firm*—Wall Marjama Bilinski & Burr

[57] ABSTRACT

A grip contains a profiled membrane (1) made of flexible material with two lips (1*c*) (1*d*) forming an interior collar, leaving the passage for the introduction of a tool shaft with any cross section free and which, when used and handled, allows the collars to fulfil the function of sealing lips and in that the profiled membrane forms at least one air chamber (1*a*) on the inside, and when the grip is handled by the user the membrane is deformed and creates a vacuum in the interior chambers (1*a*) (1*b*), forming suction pads on the tool shaft.

3 Claims, 2 Drawing Sheets

GRIPP FOR HAND STRIKE TOOLS

BACKGROUND OF THE INVENTION

This invention concerns the technical sector of hand tools, in particular grasping facilities.

A great number of hand-tools such as chisels, hammers, punch drifts and others are foreseen with a grip generally made of hard, moulded or thermoformed, plastic. These grips may incorporate a protective hand guard. They may be tightly fastened to the tool or held by one or more anchoring lips which slot into the ring-shaped groove(s) on the tool body. These methods represent the existing manufacturing types.

However, a considerable disadvantage of these methods is that when using tools such as chisels, hammers and punch drifts, strong vibrations occur, which may cause discomfort to the user. Furthermore, due to their hard form, the vibrations may be transmitted to the arm of the user, which is a considerable nuisance.

To remedy this disadvantage numerous manufacturers offer grips made of rubber material, sometimes foreseen with a honeycomb structure, which help on one hand to better absorb shocks and vibrations, and on the other hand offer better grip comfort and hold. This new type of grip partly fulfils the requirements.

Furthermore, it is well known that the grips on hand tools or hand strike tools are generally mounted once and for all and, due to their structural characteristics, mould, form and dimensions, are intended for one particular tool only. It is rarely easy to remove them.

SUMMARY OF THE INVENTION

Based on this earlier state of the art, the applicant has developed a new type of grip, with the aim to meet several objectives.

The first objective was to provide maximum absorption of vibrations resulting from the use of hand strike tools, Another objective was to ensure better grip comfort and hold.

A further objective was to design a grip which is easy to remove from the tool and which can be easily adapted to and fitted on any type of tools, independent of their characteristics, profiles or cross-sections. The task was therefore to design a new type of grip capable of adapting itself to tools with cylindrical or polygonal cross-sections with identical or almost identical size and diameter ranges.

According to a first aspect of the invention, the grip which may be adapted to hand-tools, in particular hand strike tools, is remarkable insofar that it contains a profiled membrane made of flexible material, both ends of which form an inside collar which leaves the passage for the introduction of a tool shaft with any cross section free and which, when used and handled, allows the said collars to fulfil the function of sealing lips, and insofar that the profiled membrane forms at least one air chamber on the inside, and when the grip is handled by the user the membrane is deformed and creates an air vacuum in the interior chamber(s), forming suction pads on the tool shaft.

BRIEF DESCRIPTION OF THE DRAWINGS

These characteristics and others will be explained in the following description.

The object of the invention is illustrated in a non-limitative manner in the figures of the following drawings.

In order to describe the object of the present invention more clearly, it is explained hereafter in a non-limitative manner, illustrated by the associated drawings.

Figure 3:
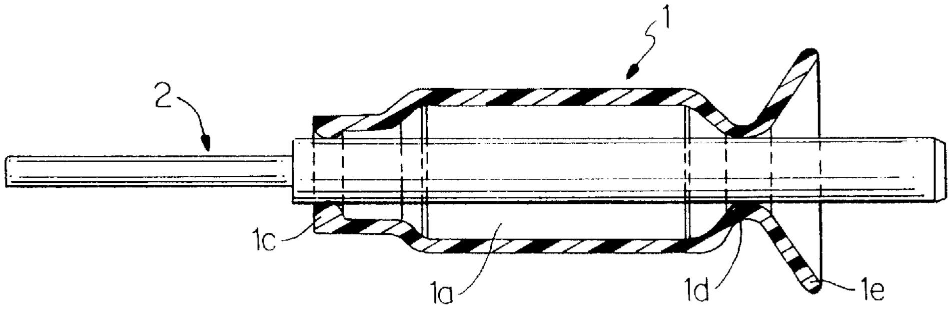
FIG. 3 is a longitudinal cross-section view of the grip alone showing its realization with a single chamber.
Figure 4:
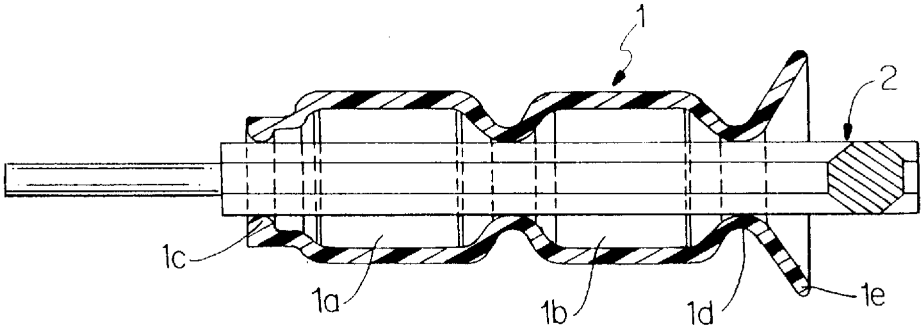
FIG. 4 is a longitudinal cross-section view of the grip alone showing its realisation with two chambers.

The grip according to the invention is identified as a whole by the number (1). It is made of an elastic and flexible rubber material. It is intended to be fixed on a hand tool and, in particular, a hand strike tool, identified by the reference number 2. This tool may have any appropriate shape, cylindrical or polygonal. The grip, which is made of flexible, elastic material, adapts itself to the tool body or shaft. It contains at least one inner cavity (1*a*), FIG. 3, or two successive cavities (1*b*), FIG. 4. Lips (1*c*) (1*d*) on the ends of the grip ensure the sealing on the body or shaft of the tool. In a non-limitative configuration, the said grip incorporates a rear profile (1*e*) forming a protective guard. In an advantageous form, the said grip is composed of two layers of different materials, one non-porous material close to the body or shaft of the tool or similar and one external layer with a flexible structure, ensuring comfort and ease for the user.

Figure 1:
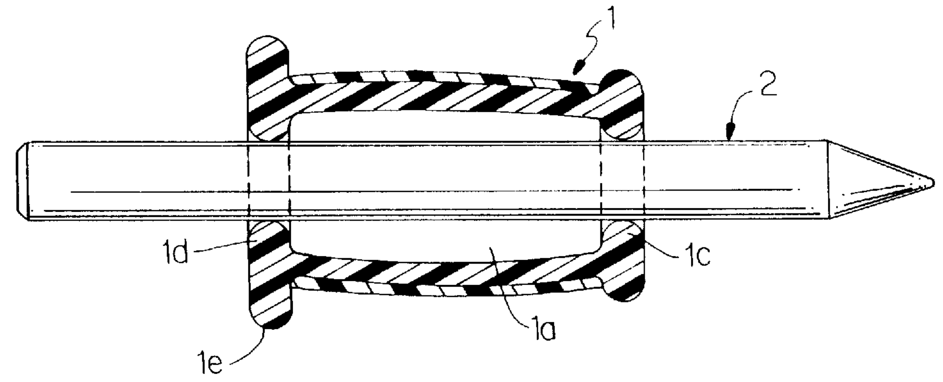
FIG. 1 is a longitudinal cross-section view of a hand tool with grip according to the invention, when not in use.
Figure 2:
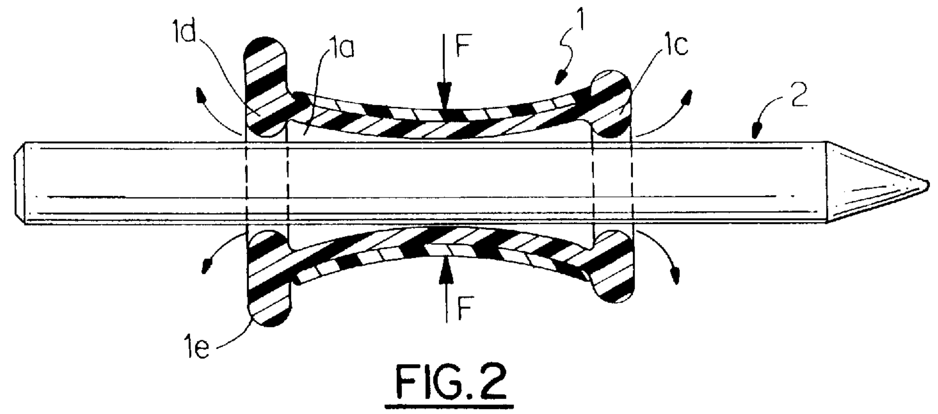
FIG. 2 is a longitudinal cross-section view of a hang tool with grip when in use.

With reference to FIG. 2, the manual tightening action in direction of arrow (F) applied by temporarily the user's hand or another means causes deformation of the grip by spreading the end lips (1*c*) (1*d*), enabling evacuation of air and creation of a vacuum. The said grip thus acts as a suction pad and clings firmly to the shaft. It is to be noted that the lips allow air passage in one direction only. The return to the initial position of the grip may be obtained by releasing the pressure applied by the user's hand and/or by spreading the lips using any means whatsoever.

According to the invention, it is very easy to move the grip on its support as required or attach it to other tools or tool shafts.

The advantages of this invention are obvious. One must stress the simplicity of the grip, its low manufacturing cost and its immediate adaptability to all types of tools as one grip may be successively mounted on different tools. Resistance and comfort of this grip are very satisfying.

I claim:

1. Gripping apparatus for engaging the hand-held section of a strike tool that includes a hollow profiled membrane formed of a flexible material having an opening passing axially therethrough, said membrane having a hand-grippable body section, a first annular lip at one end of the body section and a second annular lip at an opposite end of said body section, said first and second annular lips being formed on an interior surface of said axial opening and arranged in sealing contact against the hand-held section of a strike tool that is passed into said axial opening, said body section forming an air chamber defined between said lips and between said membrane and said hand-held section, such that the lips are caused to temporarily open when the body section of the membrane is compressed to permit air retained in said defined air chamber to be expelled therefrom and to close so as to create a vacuum in said defined air chamber thereby forming suction between said membrane and said hand-held section of the tool.

2. The gripping apparatus of claim 1 wherein said membrane is a two layered structure having a non-porous inner layer and an outer layer containing air cells offering additional comfort to the hand of a user.

3. The gripping apparatus of claim 1 that further includes a radial expanded guard at said other opposite end of said membrane for protecting the user from material freed by said strike tool.

* * * * *

UNITED STATES PATENT AND TRADEMARK OFFICE
CERTIFICATE OF CORRECTION

PATENT NO. : 5,848,453

DATED : December 15, 1998

INVENTOR(S) : Gerald Racodon

It is certified that error appears in the above—identified patent and that said Letters Patent is hereby corrected as shown below:

On the title page, item

[54] In the Title of the Invention please delete "GRIPP" in favor of -- GRIP --.

Column 4, line 2, Claim 3. Please delete "said other opposite" in favor of --said opposite--.

Signed and Sealed this

Thirtieth Day of March, 1999

Attest:

Q. TODD DICKINSON

*Attesting Officer* *Acting Commissioner of Patents and Trademarks*